(12) United States Patent
Jupe

(10) Patent No.: US 8,131,062 B2
(45) Date of Patent: Mar. 6, 2012

(54) METHOD OF PROCESSING AN IMAGE

(75) Inventor: John Jupe, Bristol (GB)

(73) Assignee: Atelier Vision Limited (GB)

( * ) Notice: Subject to any disclaimer, the term of this patent is extended or adjusted under 35 U.S.C. 154(b) by 1254 days.

(21) Appl. No.: 10/551,290

(22) PCT Filed: Mar. 25, 2004

(86) PCT No.: PCT/GB2004/001262
§ 371 (c)(1),
(2), (4) Date: May 19, 2008

(87) PCT Pub. No.: WO2004/088594
PCT Pub. Date: Oct. 14, 2004

(65) Prior Publication Data
US 2009/0310858 A1      Dec. 17, 2009

(30) Foreign Application Priority Data

Mar. 29, 2003 (GB) .................................... 0307307.9
Dec. 12, 2003 (GB) .................................... 0328839.6

(51) Int. Cl.
*G06K 9/00* (2006.01)
*G06T 15/00* (2006.01)
*G01C 3/14* (2006.01)
(52) U.S. Cl. ........................... 382/154; 345/419; 356/12
(58) Field of Classification Search ........................ None
See application file for complete search history.

(56) References Cited

U.S. PATENT DOCUMENTS 6,157,733 A * 12/2000 Swain ........................... 382/154
7,113,650 B2 * 9/2006 Liu et al. ....................... 382/276
2002/0139920 A1 * 10/2002 Seibel et al. ............... 250/208.1
2002/0167512 A1   11/2002 Lee

FOREIGN PATENT DOCUMENTS

EP         0 514 266        11/1992

OTHER PUBLICATIONS

Swain "Intergration of Monicular Cues to Create Depth Effect", IEEE, 1997, pp. 2745-2748.*
Favaro, "Depth from Focus/Defocus", http://homepages.inf.ed.ac.uk/rbf/CVonline/LOCAL_COPIES/FAVARO1/dfdutorial.html, Jume 2002.*
Pentland "ANew Sense for Depth of Field", Pattern Analysis and Machine Intelligence, IEEE Transactions, Jul. 1987, pp. 523-531.*
Subbarao et al. "Depth from Defocus: Spatial Domain Approach", International Journal of Computer vision, 13, 1994, pp. 271-294.*
Swain, C.T.: "Integration of Monocular Cues to Create Depth Effect", Acoustics, Speech, and Signal Processing. 1997. ICASSP-97, 1997 IEEE International Conference on Munich, Germany Apr. 21-24, 1997, Los Alamitos, CA, USA. IEEE Comput. Soc., US Apr. 21, 1997, pp. 2745-2748, XP010225724, ISBN: 0-8186-7919-0 abstract, p. 2746, left hand column, line 27-line 31.

* cited by examiner

*Primary Examiner* — Randolph I Chu
(74) *Attorney, Agent, or Firm* — Skinner and Associates

(57) ABSTRACT

An image processing technique comprises the steps of: (a) stretching an original image in the Y-direction (vertical) by a factor falling within the range of 2-10%; selecting a fixation point and disordering operation around the fixation point; and rotating the image through an angle falling within the range of 3-9°, preferably clockwise; (b) stretching a copy of the original image in the X-direction (horizontal by a factor falling within the range of 2-10%; and selecting an area of the image around the selected fixation point; and (c) merging the selected area of the image formed in step (b) with the image formed in step (a).

8 Claims, 9 Drawing Sheets

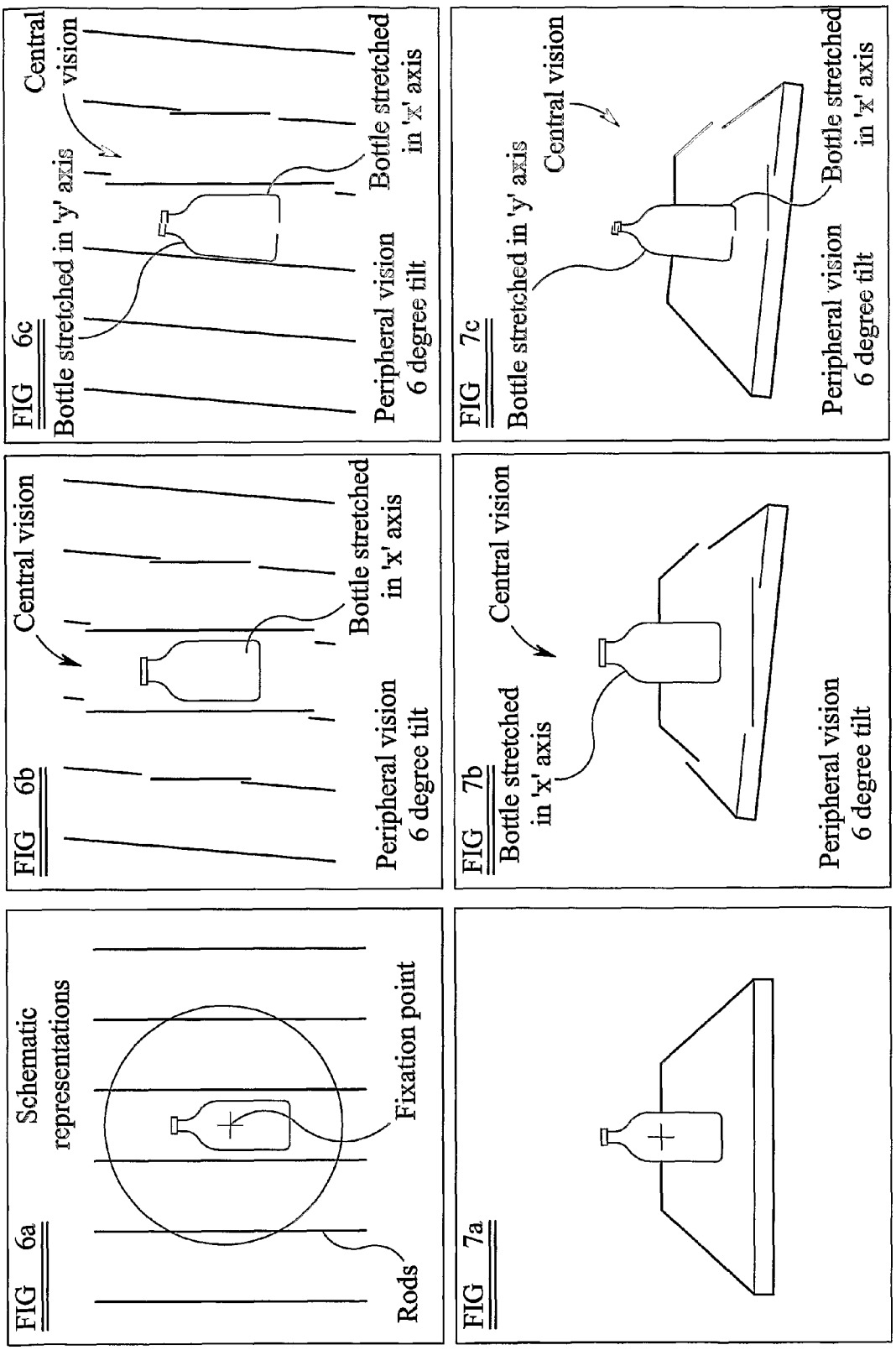

METHOD OF PROCESSING AN IMAGE

This invention relates to an image processing or manipulation technique, and in particular to a technique that may be used to enhance our appreciation of 3D depth and form depicted in base 2D images and derivative virtual reality (VR) environments. Images processed in this manner may be of improved believability, thus the invention allows an increase in the believability threshold.

When three-dimensional scenes are displayed or depicted using conventional two-dimensional techniques, for example by printing on to paper or the like or displaying on a television, computer monitor or the like, or by projection, although the brain perceives the images displayed as being to some extent three-dimensional in nature, there are occasions when the perception of depth and form in the displayed image is not particularly good. This is thought to be due to the absence of sufficient monocular depth cues in the image to allow the brain to interpret the displayed image fully.

In the following description a distinction is made between 'pictures' and 'images'. The following definitions of pictures and images have been made by Prof Jan Koenderink (Vision Scientist), and the terms as used herein should be interpreted accordingly.

Picture: "a real image, an ordered record, such as a video-signal, a photograph, an activity pattern in a neural structure. The order of the picture is purely conventional and exists only with respect to an external agent."

Images: "always contain more than pictures because the whole structure of the receiver (a lifetime's experience) is summed up in them."

This invention relates, at least to some degree, to the isolation of the techniques that transform pictures to images.

The technique of the invention has been developed from theoretical work identifying a new form of illusionary space which has been termed 'image space' (thus distinguishing itself from traditional picture space). Image space acknowledges the individual nature and specialisms of peripheral vision and central vision and also that brain function 'creates' important facets of visual perception by making 'relativistic judgments' between the two. Key to the novelty of this approach is the realization that these new cues rely on as yet unappreciated monocular cues and the composition of monocular projection. These monocular cues distinguish this method of achieving apparent 3D depth from other techniques that rely on stereo cues deriving from binocular disparity etc. By correctly representing and aligning two projections used in monocular vision by the brain to compose perceived images (the projection known as vision) it is possible to induce the brain to replicate depth and form perceptions that could otherwise only be created by directly observing the 'real setting' from which the pictorial information derived.

'Image Space' can be achieved/induced in a number of ways pictorially.

1. By imbuing traditional picture space (perspective projection or photographic/film record) with the required cues.
2. By using the principles to model a new illusionary space to generate novel virtual reality (VR) environments.

It is an object of the invention to provide a system, which may be used in combination with existing techniques, whereby an image may be created or modified to enhance the perception of the depth in the original picture. In each case, image space relies on the incorporation of stimuli from which the brain is able to deduce additional perceptions of depth and form associated with our sense of visual perception.

According to one aspect of the invention there is provided an image processing technique comprising the steps of:

(a) stretching an original picture in the Y-direction by a factor falling within the range of 2-10%;
  selecting a fixation point and disordering the image centering the disordering operation around the fixation point, and
  rotating the image through an angle falling within the range 3-9°;
(b) stretching a copy of the original image in the X-direction by a factor falling within the range of 2-10%; and
  selecting an area of the image around the selected fixation point; and
(c) merging the selected area of the image formed in step (b) with the image formed in step (a).

In step (a), the rotation of the image is preferably in a clockwise direction. A minority of individuals may prefer the image to be rotated in the opposite direction and which the technique is used to produce an image to be viewed by such individuals, the rotation may be undertaken in the anti-clockwise direction.

The disordering operation preferably involves disordering in line with a chosen self-similar fractal disorder pattern.

The image formed as a result of the transformation set out in step (a) will hereinafter be referred to as a Type 1 image, and that produced in the transformation set out in step (b) will be referred to as a Type 2 image.

This technique can be thus be used to:

i) mimic the appearance of the two base projections used by the brain in our monocular projection of the real world by transforming known picture environments.

ii) replicate a typical composition/structure of these base projections used by the brain to form perceived visual images.

The key to forming a valid composition is the selection of a fixation point, the establishing of a fixation area (conforming to known constraints of central vision) and the correct imposition of conditions prevailing in 'the fixation volume', peripheral vision and around the interface between the Type 1 image and the Type 2 image. As in real time observation, a fixation point needs to be established on the media. The fixation point is the point around which the various transformations techniques are to be centered. It is thought that the enhanced 3D depth and form cues are established by:

1. the brain as it makes relativistic judgments between interface between the two sets of information around central vision.
2. an authentic representation of the specialist rendition of self-similar disordered information in peripheral vision providing a new form of spatial dimension.

Without a central point of alignment (fixation point) from both data sets, it would be impossible for the brain to make the required calculations. The fixation area establishes an area around the fixation point broadly analogous to the extent of central vision. As such, the fixation area establishes the extent of the image to be subjected to the specific conditions of the fixation volume. The fixation volume is a spherical area of influence contained within the fixation area. Any form (object), surface or part of a form that projects into this area of influence is projected in the brain as per the qualitative and quantitative characteristics of image type 2 above.

It follows that any other visual reference to objects outside of this fixation volume contained in the fixation area are referenced as per the image type 1 above.

Areas of central vision outside the fixation volume are referenced as per the characteristics of 'peripheral vision'.

There are a number of typical compositions used by the brain, which utilize aspects, and juxtapositions of the two image types in away capable of generating the relativistic judgments from which the new cues are deduced.

Images processed in this manner are thought to conform more fully with our projection of real-time monocular observations (visual images) allowing the brain to correctly interpret a fuller range of three-dimensional cues from the 2D image or virtual reality setting. The projection of monocular vision would appear to be compiled from two data sets which allows the brain to have certain degrees of freedom when compiling visual field. It has been noted that these potential compositions have been adapted to suit the specific task being undertaken by the viewer. For example, reading 2D literature requires little 3D information. This order of information could even provide a distraction to the task in hand. In this situation only one data set is used reducing the visual information being processed. A specialist composition is used when detailed spatial analysis is required. One where half of central vision is suppressed allowing for aspects of Type 1 information to spread into central vision up to the fixation point. This process allows the important brain function responsible for making relativistic judgements and hence enhances form cues to play over the actual object held in fixation. Aspects of this composition are often revealed in the work of visual artists painting still life material.

The nature and structure of information contained in peripheral vision is still largely unresolved by vision science. This invention uses the qualities of self-similar (fractal) disorder (not blur) to replicate the order of information projected outside central vision (peripheral vision). This invention identifies a novel step in attributing peripheral vision with an independent 3D dimension centred on fixation. ie, the level of disorder generates out from fixation in every direction. Hence, 2D pictures are transformed to replicate this order of information by building layers of disorder backwards, forwards and outward on the vertical plane from the targeted fixation. This establishes a new form of spatial dimension in the image. For still images this technique is seen to enhance depth perception in the image. However, the real advantage is thought to lie in its ability to impart accurate renditions of perceived movement in moving images. Once mastered, movement around the targeted fixation will now be closer to our perception of movement observed from 'real settings'. This 3D information can be captured for use in the transformation process as a 'depth map' using specialist equipment, for example making use of laser imaging or LED lighting technologies combined into film cameras.

Moving images will also require changes to the targeted fixation points as the action depicted on them develops. Techniques for inducing a change in fixation will be incorporated into action depicted in moving media to lead the viewer through the eye movement procedure.

The processing technique may require additional steps of fine-tuning around the boundary between the images formed in steps (a) and (b).

Step (a) of the processing technique may further include steps of altering the contrast of Type 1 information by a factor falling within the range of +10-40% and/or decreasing the brightness of the image by a factor falling within the range 2-40%. If contrast is increased in this way, then colour saturation should preferably be reduced to an accommodation level (usually to match the increase of level in contrast).

The technique defined hereinbefore may be performed using a computer on image data derived, for example, from a scanner or digital camera, or on digital picture data obtained or created from other sources including computer programs. However, it will be appreciated that the technique may be performed in other ways, and the invention is not restricted to the specific arrangements or applications described herein.

The invention will further be described, by way of example, with reference to the accompanying drawings, in which:

FIGS. 6 to 10 are further views illustrating the effect of the process;

Figure 1:
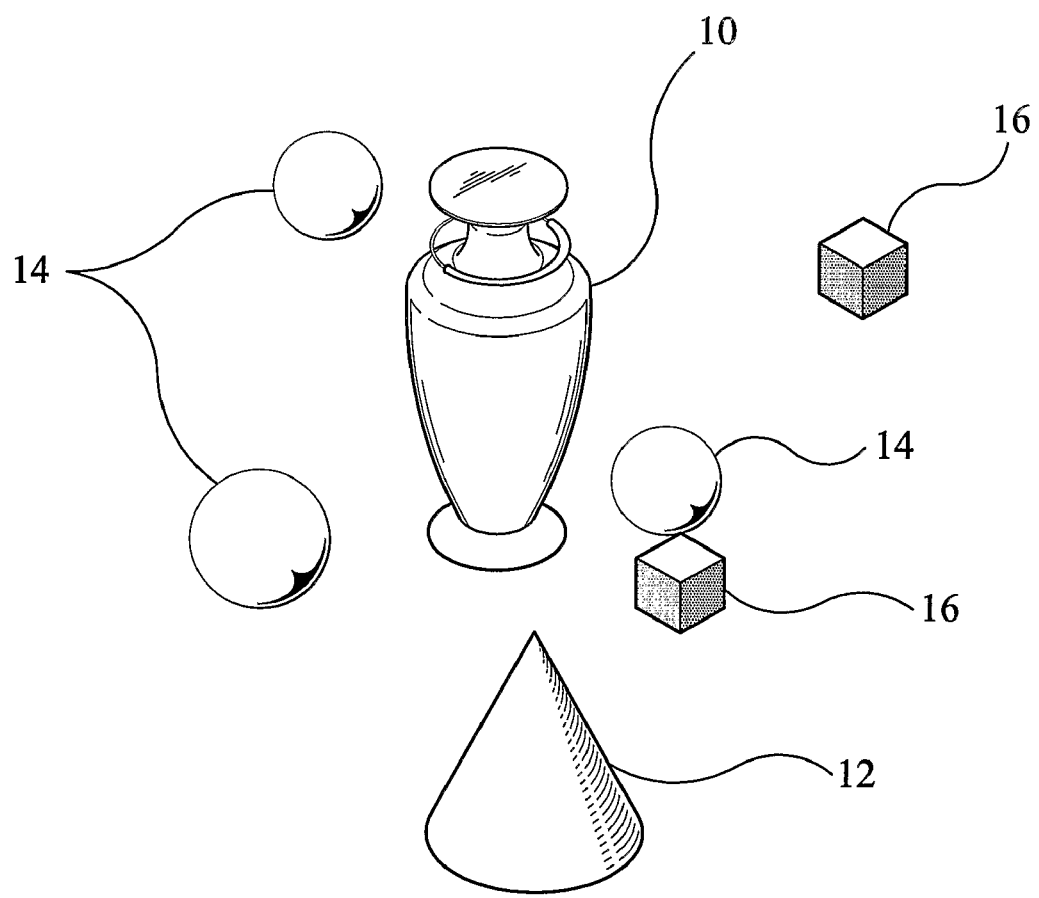
FIG. 1 is an illustration prior to use of the image processing technique.

The invention will, initially, be described with reference to the image illustrated in FIG. 1. As can clearly be seen, FIG. 1 is a computer generated or virtual reality representation of a vase 10, a cone 12, spheres 14 and cubes 16. As each of the objects illustrated are three-dimensional objects, the illustration uses isometric projections to provide depth cues to be interpreted by the brain in an attempt to make the objects appear to be an accurate representation of their form in three-dimensional space. Each object is isolated from all of the other objects, and no central perspective cues to indicate the relative positions of the objects are present. As a result, it is difficult for the brain to interpret the image to determine, for example, the relative sizes of the objects and their positions in three dimensional space. In the image, both of the cubes are drawn as the same size and are perceived as being the same size despite one being further away than the other.

Figure 2:
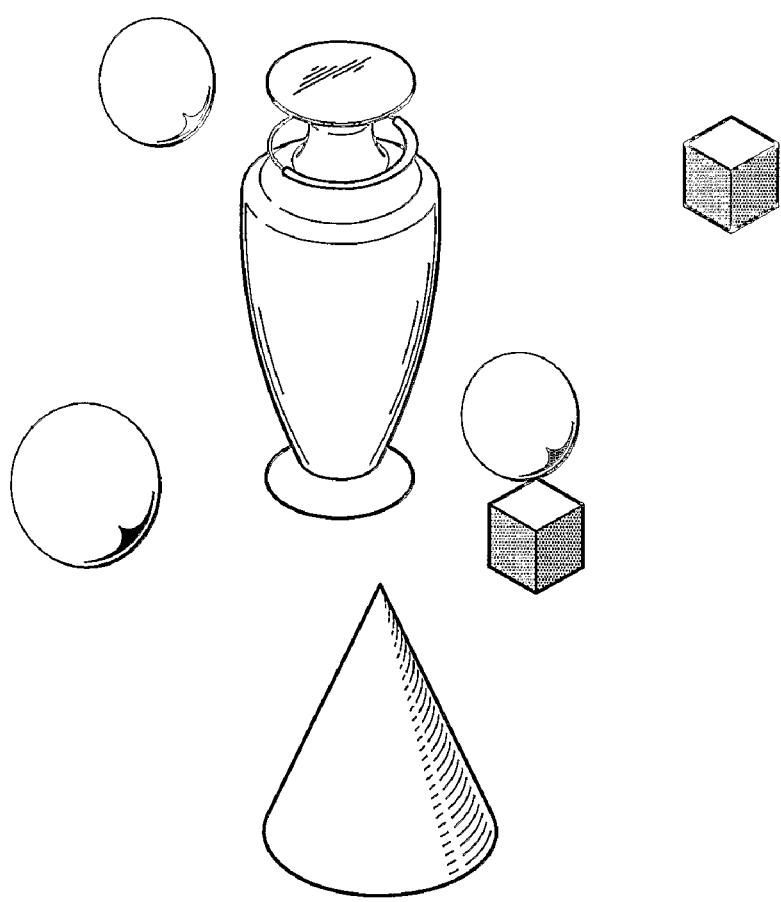
FIGS. 2 and 3 illustrate steps of the image processing techniques.

In accordance with the invention, the base image of FIG. 1 is processed to form an image of improved form. This is achieved by taking the image of FIG. 1 and performing a transformation thereon whereby the image is stretched in the Y-direction (vertical) by a factor falling within the range 2-10%, preferably about 51%, is disordered and is rotated through an angle falling within the range 3-9° clockwise, preferably 6° clockwise. FIG. 2 illustrates the effect of the stretching and rotation of the image, but (for clarity) not the impact of disordering the image. The order in which these operations may be varied, but the values/factors used may need to be varied if the order is not as described.

Figure 3:
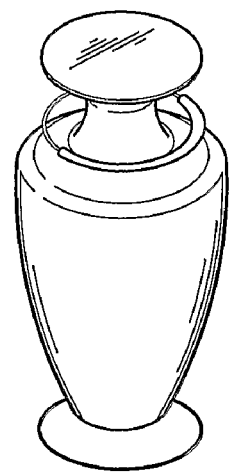

Another copy of the image is stretched by a factor of 2-10% in the X-direction (horizontal). Preferably, it is stretched to ensure a differential with the image in the previous transformation of around 5-20%. A fixation point on the image is selected, and an area around the fixation point is selected, the remainder of the image being deleted. The result of this operation is shown in FIG. 3, where the centre of the vase has been selected as the fixation point.

Figure 4:
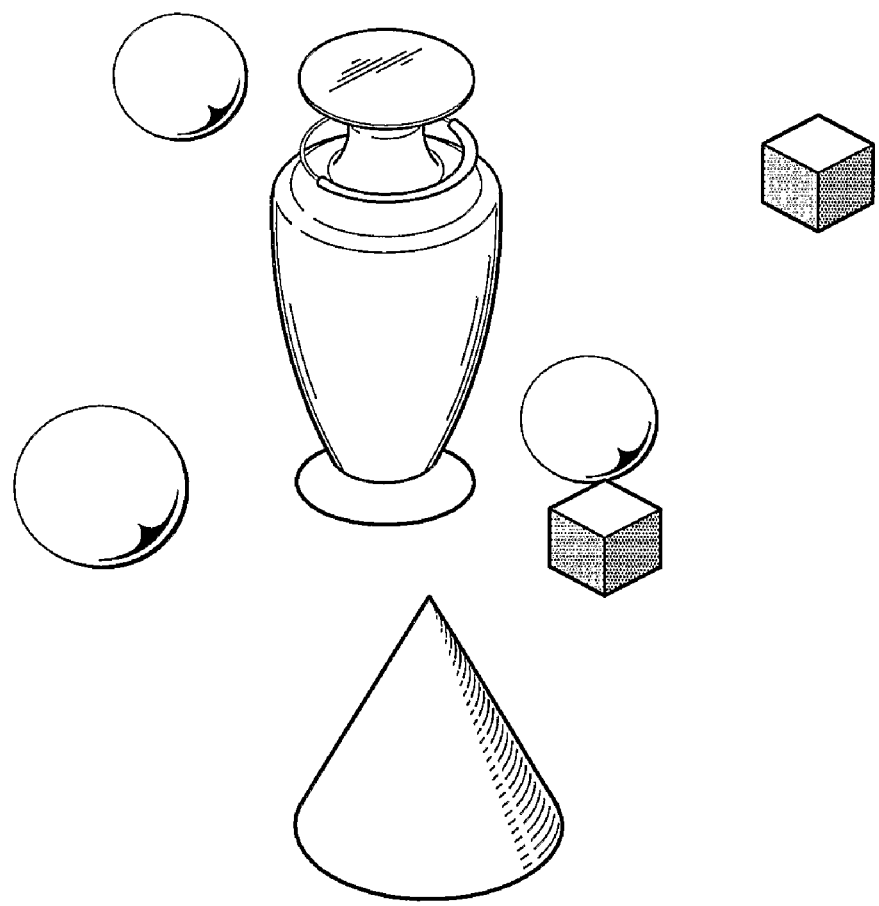
FIGS. 4 and 5 illustrate the processed form of the illustration of FIG. 1.
Figure 5:
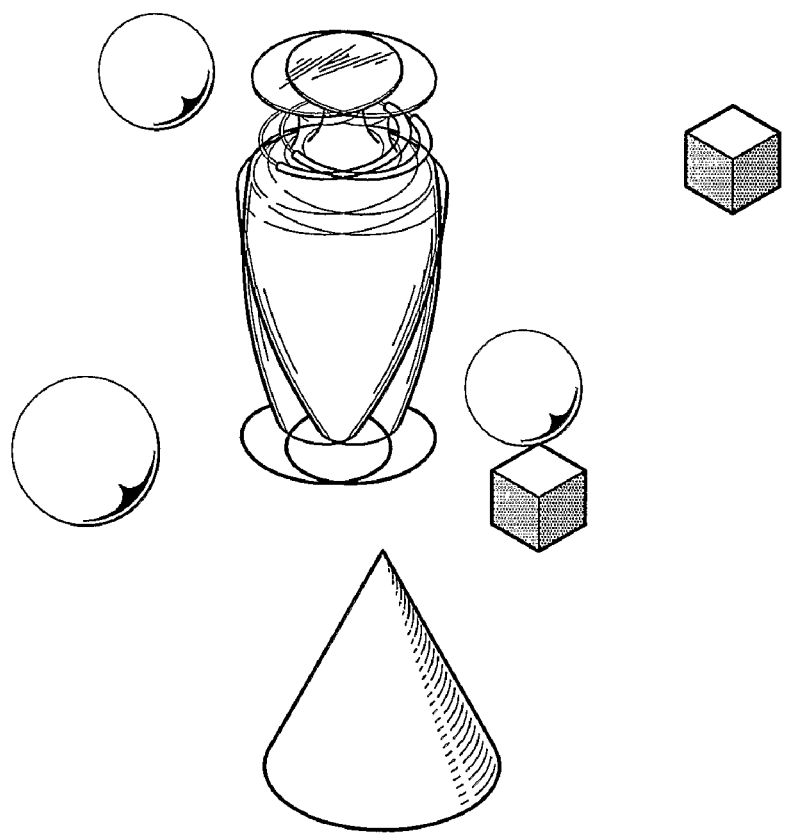

The two images produced in this manner are superimposed upon one another. The images may be superimposed using several different techniques. FIG. 4 illustrates the effect of taking the image of FIG. 2 and simply replacing an area around the fixation point with the image of FIG. 3. FIG. 5 illustrates the result of an alternative superimposition technique wherein the two images are overlaid and parts of both images are visible, the vase taking the form of a fused form. The fixation area is the vase; this comprises a combined form fused from both image types 1 and 2 in what at first seems an odd looking conjunction. However, when the centre of the vase is fixated, the two identities are merged by the brain into a single percept. This percept is of a more three dimensional vase. This capacity for increased 3D percept is now extended to all the other objects in the picture. For example the further of the two cubes is now perceived to be larger than the closer cube.

Referring next to FIGS. 6a, 6b and 6c, FIG. 6a shows in schematic form a bottle 20 located between six vertically extending bars 22. The illustration of FIG. 6a is modified or processed in accordance with an embodiment of the invention to form the image of FIG. 6b. For clarity, again, the disordering operation has been omitted. When the image of FIG. 6b is viewed by fixating upon the center of the bottle 20, an improved degree of depth can be seen in the image as compared to the picture of FIG. 6a, the image of FIG. 6b containing a greater level of depth cues for the brain to interpret that the illustration shown in FIG. 6a. FIG. 6c is another image formed using the process described hereinbefore, but using a different, smaller part of the original illustration as the fixation area.

FIGS. 7a, 7b and 7c are similar to FIGS. 6a, 6b and 6c but illustrating a bottle 24 positioned upon a table 26.

This percept of 3D form and depth is, in some ways, analogous to the percept obtained by perspective space. However, it is now thought that perspective cues are not the principle method by which spatial depth is obtained in central vision or through the full extent of visual field. Rather, we see spatial depth and form by a process that involves our visual system making relativistic judgments between two distinct data sets or image types. The arrangement identified above stimulates the brain to engage with this process when observing 2D space, providing us with cues more conversant with our appreciation of real settings.

The new image space allows us to create depth in a similar way to the way it is perceived in our actual visual appreciation of our surroundings. Looking at the new image space will be closer to an actual act of real time observation.

Figure 8:
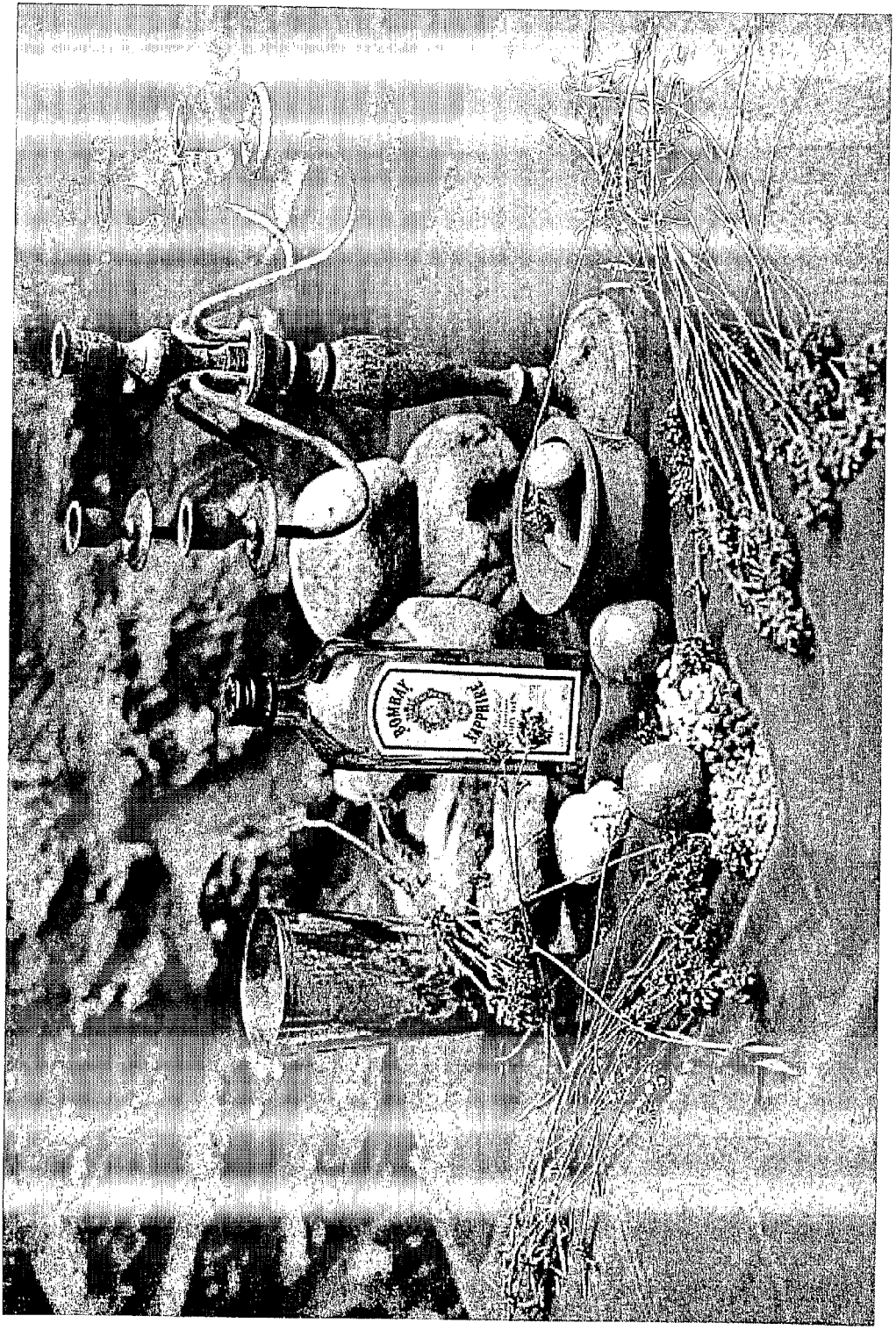
Figure 9:
Figure 10:
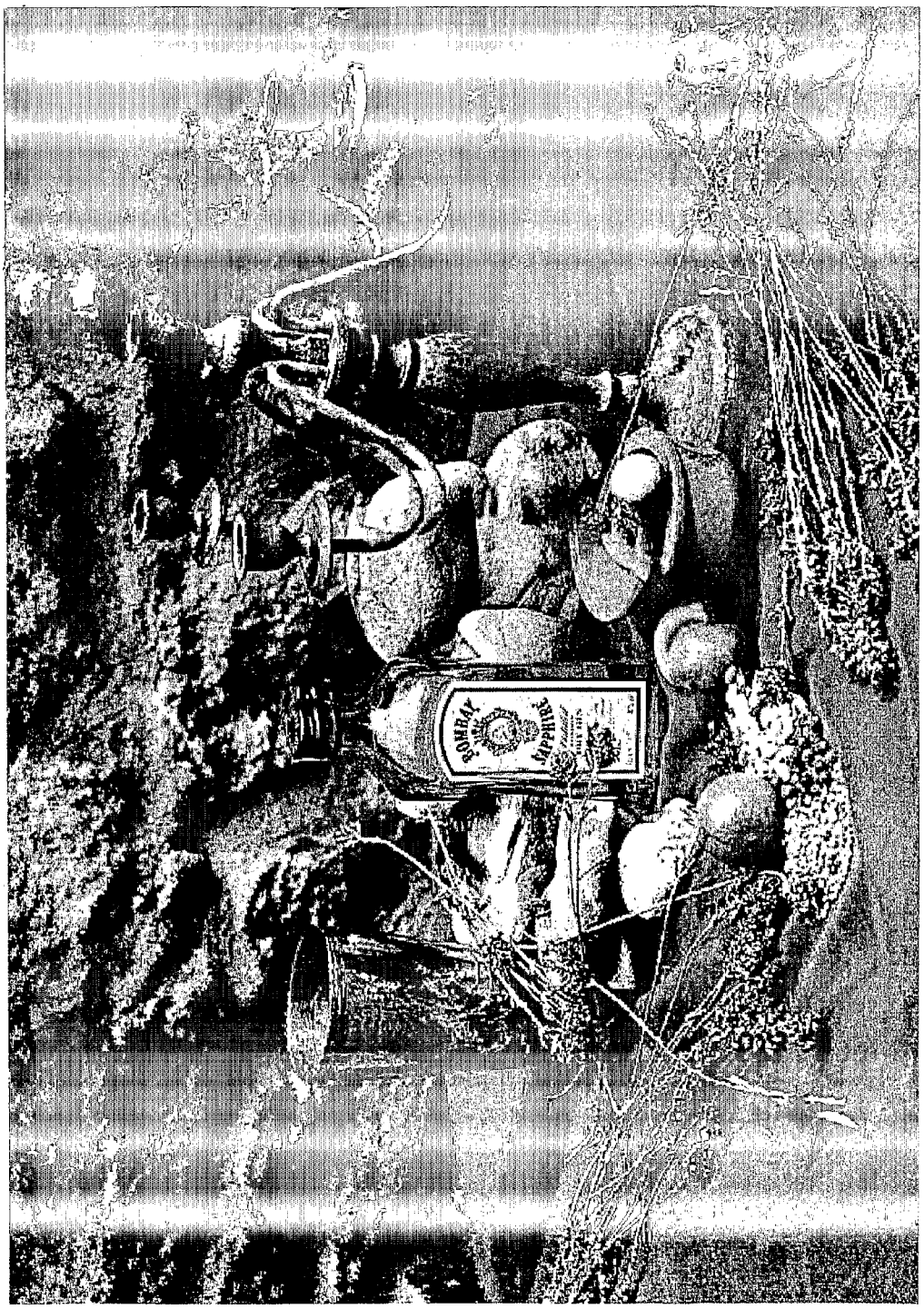

Referring next to FIGS. 8 to 10, an original digitised photograph of a real setting is shown in FIG. 8. The key to forming a valid composition is the selection of a fixation point and fixation area, and the correct imposition of conditions prevailing in 'the fixation volume' and peripheral vision. In the present case, the centre of the bottle has been selected as the fixation point. FIG. 9 shows the effect of performing the transformations described hereinbefore, but omitting the disordering operation for clarity, and simply replacing the part of the image around the fixation point on one image with the relevant part of the other image. Items within the fixation area, established round the fixation point, are represented as image type 2 with some of the associated qualitative and quantitative transformations. Outside the fixation area, all objects and surfaces are rendered as per image type 1 with the associated qualitative and quantitative transformations. As can be seen in FIG. 9, the boundary 18 between the two images in the merged image is clearly visible. FIG. 10 illustrates the result of a modified superimposition technique which removes or reduces the impact of the boundary between the images, and shows the establishment of the fixation volume where all surfaces and objects not contained by the spherical influence of the fixation volume are also rendered as per image type 1.

For example; around the neck of the bottle the stones of the wall, although within the circumference of the fixation area of FIG. 9, are too far from the bottle to be included in the fixation volume and so are referenced as per image Type 1.

For example; one arm of the candelabra penetrates the fixation volume and so is referenced as per image Type 2 while the rest of the object is outside this area of influence and so is rendered as per image type 1.

By comparing FIGS. 9 and 10 with FIG. 8 it is apparent that, in addition to the transformations mentioned hereinbefore, the image which has been stretched in the Y-direction has also been modified by increasing the level of contrast and reducing the level of colour saturation. Also the brightness of the image has been reduced. The contrast has been increased by an amount falling within the range 10-40%, preferably about 25%, and the brightness has been reduced by a factor falling within the range 2-40%, preferably about 10%. The toning down of colour saturation is to balance for the effects of higher contrast and is broadly proportional.

It is thought that images processed using the techniques described hereinbefore are of improved or increased resemblance to images projected by the brain. Using this structure/armature in digitised medial, it will be possible to enter many facets of the differences known to exist between peripheral vision and central vision. Clear and accurate representation of perceived visual image compositions allows an observer of the 2D rendition to engage in additional computations leading to a more viable perception of the real setting being depicted.

An observer of the transformed image will need to look at (fixate on) the selected fixation point to perceive/appreciate the full impact of the additional cues.

Figure 11:
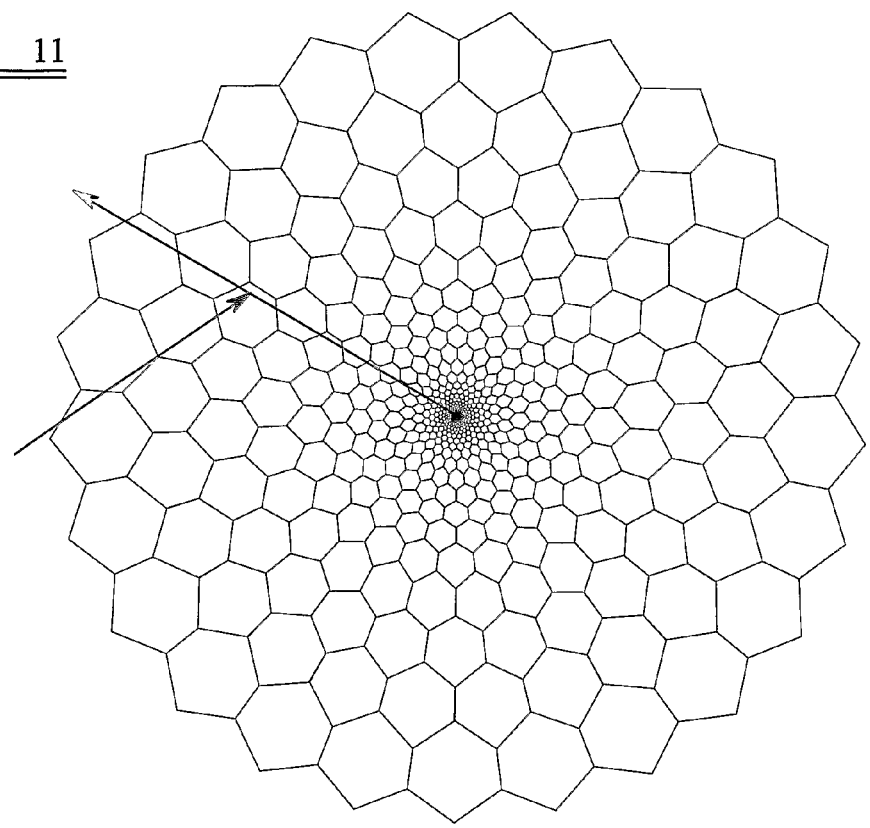
FIG. 11 is a diagram illustrating part of the process.

In the description hereinbefore reference has been made to a step of disordering the image. Although a number of disordering techniques may be used, a preferred technique is to incrementally disorder the image using, for example, the sunflower-like fractal pattern shown in FIG. 11 to reduce the amount of detail visible, in the processed image with increasing distance from the fixation point. The novel aspect included as part of this submission refers to the use of and adaptation of this pattern into a 3D spatial dimension independent to other 3D cues used in picture information (perspective for example).

Figure 12:
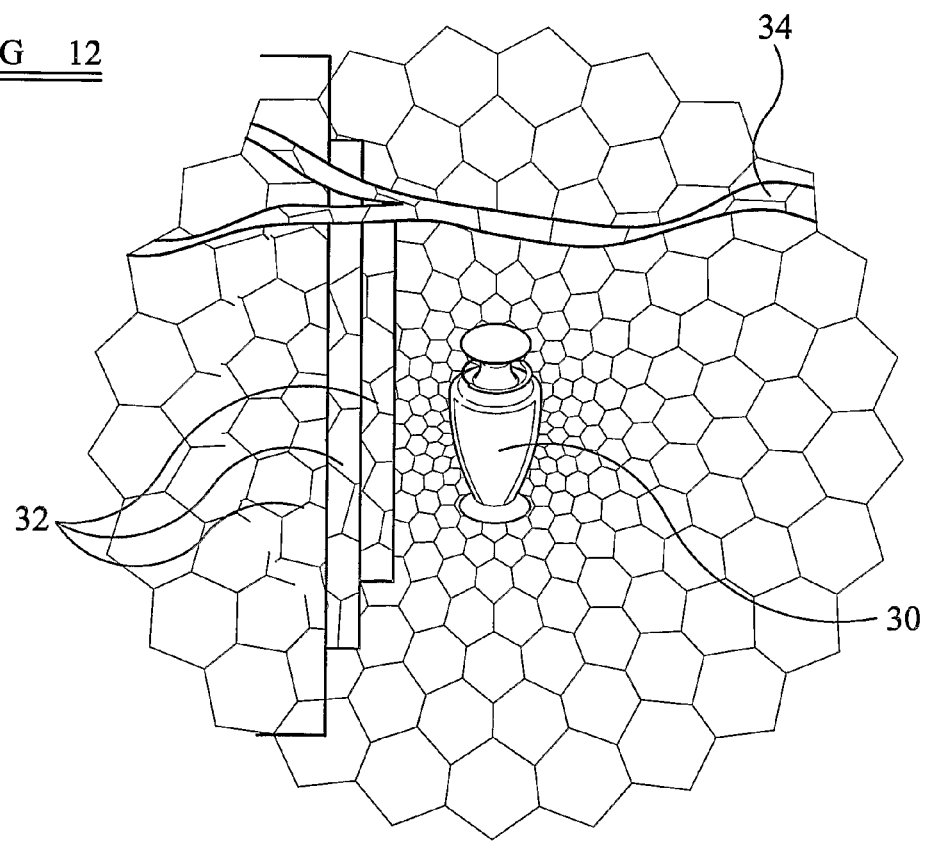
FIG. 12 is a diagram illustrating a modification to the technique.

FIG. 12 is a diagrammatic view illustrating one way in which the disordering operation may, preferably, be performed. The image of FIG. 12 includes, at its fixation point, a vase 30. Three flat vertical screens 32 are positioned, in line, in front of and to one side of the vase 30. A tree branch 34 extends across the foreground, in front of all of the other objects. In the arrangements described hereinbefore the disordering operation has been conducted so as to introduce only a small level of disorder into the part of the image immediately surrounding the fixation point, the degree of disorder increasing, in line with the sunflower pattern of FIG. 11, with increasing distance from the fixation point. In the arrangement of FIG. 12, although this general approach has been taken, the disordering operation has been modified to identify the boundaries or edges of the objects illustrated and to introduce a disruption or jump in the degree of disordering at the edges or boundaries. The disruptions to the degree of disorder give rise to further spatial depth cues in the image for interpretation by the viewer's brain.

It is thought that images processed using the techniques described hereinbefore provide an improved or increased perception or projection of depth to the part of the image around the fixation point and through peripheral areas. The enhanced perception of depth is apparent both where a viewer views the image through both eyes and when the image is viewed using only one eye. Stereo blind subjects perceive the additional depth these transformed images contain. In contrast, the organised depth of stereo based assemblages fail to engage stereo blind individuals.

Although the techniques have been described hereinbefore in relation to the processing of pictures, either in the form of computer generated pictures or photographs, it will be appreciated that this need not be the case and the invention may be applied to a wide range of technologies and display techniques including computer or television displays, projected images, virtual reality displays, animations and printed media. The invention may also find application in, for example, cameras (either for stills or for moving images) which are designed to incorporate a display on which the transformed image can be displayed in "real time" so that the photographer, director or other person involved in the capturing of the image can see how it will be transformed before the image is captured, or completion of the capture takes place. In order to accommodate this, the camera may be provided sensors to allow the depths of objects in the field of vision to be measured at the same time as the image is captured, these two components being used in conjunction with one another and in conjunction with the techniques described hereinbefore in the transformation of the image. Additionally, the location of the fixation point in the field of view will need to be input. This could be set at the centre of the field of view or, using appropriate input means, may be selected by the director, photographer or other individual.

The invention claimed is:

1. An image processing technique comprising the steps of:
    (a) stretching an original image in the Y-direction (vertical) by a factor falling within the range of 2-10% to produce a stretched version of the original image;
    selecting a fixation point and disordering the stretched version of the original image centering the disordering operation around the fixation point to form a disordered, stretched version of the original image; and
    rotating the disordered, stretched version of the original image through an angle falling within the range 3-9° to form a rotated, disordered and stretched version of the original image;
    (b) stretching a copy of the original image in the X-direction (horizontal) by a factor falling within the range of 2-10% to form a second stretched version of the original image; and
    selecting an area of the second stretched version of the original image around the selected fixation point; and
    (c) merging the selected area of the second stretched version of the original image formed in step (b) with the rotated, disordered and stretched version of the original image formed in step (a).

2. A technique as claimed in claim 1, further comprising an additional step of fine tuning the boundary between the images formed in steps (a) and (b).

3. A technique as claimed in claim 1 wherein step (a) of the processing technique further includes steps of altering the contrast by a factor falling within the range of 10-40% and/or decreasing the colour saturation of the stretched version of the original image by a factor falling within the range 10-40%.

4. A technique according to claim 3, further comprising a step of decreasing the brightness by a factor falling within the range 2-40%.

5. A technique according to claim 1, wherein the rotation is undertaken in the clockwise direction.

6. A technique according to claim 1, wherein the disordering operation of step (a) involves disordering the stretched version of the original image in line with a self similar fractal disorder pattern.

7. A technique according to claim 1, further comprising, in step (a), identifying at least one boundary or edge of at least one object and introducing a disruption in the degree of disordering at the said boundary or edge.

8. A computer programmed to perform the technique claim 1 on image data derived from a scanner, a digital camera, or on digital image data obtained or created from other sources including computer programs.

* * * * *